(12) United States Patent
Caze et al.

(10) Patent No.: US 8,211,376 B2
(45) Date of Patent: *Jul. 3, 2012

(54) DEVICES AND METHODS FOR HONEYCOMB CONTINUOUS FLOW REACTORS

(75) Inventors: Philippe Caze, Fontainebleau (FR); Celine Claude Guermeur, Chartrettes (FR); James Scott Sutherland, Corning, NY (US)

(73) Assignee: Corning Incorporated, Corning, NY (US)

( * ) Notice: Subject to any disclaimer, the term of this patent is extended or adjusted under 35 U.S.C. 154(b) by 274 days.

This patent is subject to a terminal disclaimer.

(21) Appl. No.: 12/346,090

(22) Filed: Dec. 30, 2008

(65) Prior Publication Data

US 2009/0169445 A1 Jul. 2, 2009

Related U.S. Application Data (60) Provisional application No. 61/063,090, filed on Jan. 31, 2008, provisional application No. 61/018,119, filed on Dec. 31, 2007.

(51) Int. Cl.
*B01J 8/02* (2006.01)
*B01J 35/02* (2006.01)
*B01J 19/00* (2006.01)
*B01D 50/00* (2006.01)
*B01D 53/34* (2006.01)

(52) U.S. Cl. ........ 422/222; 422/129; 422/168; 422/171; 422/177; 422/211

(58) Field of Classification Search .................. 422/129, 422/168, 171, 177, 211, 222
See application file for complete search history.

(56) References Cited

U.S. PATENT DOCUMENTS

| | | | |
|---|---|---|---|
| 4,041,591 A * | 8/1977 | Noll et al. | 29/890.034 |
| 4,126,178 A | 11/1978 | Kelm | 165/165 |
| 4,155,981 A | 5/1979 | Chubb | 422/198 |
| 4,363,787 A | 12/1982 | Yoon | 422/201 |
| 5,034,023 A * | 7/1991 | Thompson | 205/634 |
| 5,416,057 A | 5/1995 | Lipp et al. | 422/171 |
| 6,040,266 A * | 3/2000 | Fay et al. | 502/439 |
| 6,309,618 B1 * | 10/2001 | Ohira et al. | 423/240 R |
| 6,372,375 B1 | 4/2002 | Lawless | 429/40 |
| 6,379,485 B1 * | 4/2002 | Borglum | 156/89.11 |
| 2002/0031455 A1 | 3/2002 | Hippel et al. | 422/173 |
| 2005/0129907 A1 * | 6/2005 | Yamaguchi | 428/116 |
| 2007/0009426 A1 | 1/2007 | Leveson | 423/659 |
| 2007/0258872 A1 * | 11/2007 | West et al. | 422/222 |
| 2010/0143215 A1 * | 6/2010 | Caze et al. | 422/198 |
| 2010/0326532 A1 * | 12/2010 | Caze et al. | 137/1 |

FOREIGN PATENT DOCUMENTS

| | | |
|---|---|---|
| EP | 0752390 A1 | 1/1997 |
| WO | WO2008/121390 | 10/2008 |

* cited by examiner

*Primary Examiner* — Walter D Griffin
*Assistant Examiner* — Natasha Young
(74) *Attorney, Agent, or Firm* — Gregory V. Bean

(57) ABSTRACT

Disclosed is a reactor for reacting fluids such as fluids in continuous flow, the reactor including a multicellular extruded body having cells extending in parallel in a direction from a first end of the body to a second end, the body having a first plurality of cells open at both ends of the body and a second plurality of said cells closed at one or both ends of the body, the second plurality being contiguous cells and cooperating to define at least in part a fluidic passage extending at least partly through the body. The fluidic passage desirably has a serpentine path back and forth along cells of the second plurality of cells, and the passage connects laterally from cell to cell, within cells of the second plurality, at or near the ends of the body.

20 Claims, 9 Drawing Sheets

DEVICES AND METHODS FOR HONEYCOMB CONTINUOUS FLOW REACTORS

PRIORITY

The present application is related to U.S. Provisional Application Ser. No. 61/063,090 filed 31 Jan. 2008 entitled Devices and Methods For Honeycomb Continuous Flow Reactors and to U.S. Provisional Application No. 61/018,119 filed 31 Dec. 2007 of the same title as the present application.

BACKGROUND

The present invention relates generally to Honeycomb Continuous Flow Reactors, more specifically to devices and methods for use with honeycomb continuous flow reactors, particularly to devices and methods for fluid routing, fluid porting, manifolding, and sealing in or in conjunction with honeycomb continuous flow reactors.

SUMMARY

A reactor for reacting fluids such as fluids in continuous flow, or alternatively in intermittent flow, according to one embodiment of the present invention, includes a multicellular extruded body having cells extending in parallel in a direction from a first end of the body to a second end, the body having a first plurality of cells open at both ends of the body and a second plurality of said cells closed at one or both ends of the body, the second plurality being contiguous cells and cooperating to define at least in part a fluidic passage extending at least partly through the body. The fluidic passage has a serpentine path back and forth along cells of the second plurality of cells, and the passage connects laterally from cell to cell, within cells of the second plurality, at or near the ends of the body.

DETAILED DESCRIPTION

Reference will now be made in detail to the presently preferred embodiments of the invention, instances of which are illustrated in the accompanying drawings. Whenever possible, the same reference numerals will be used throughout the drawings to refer to the same or like parts.

Figure 1:
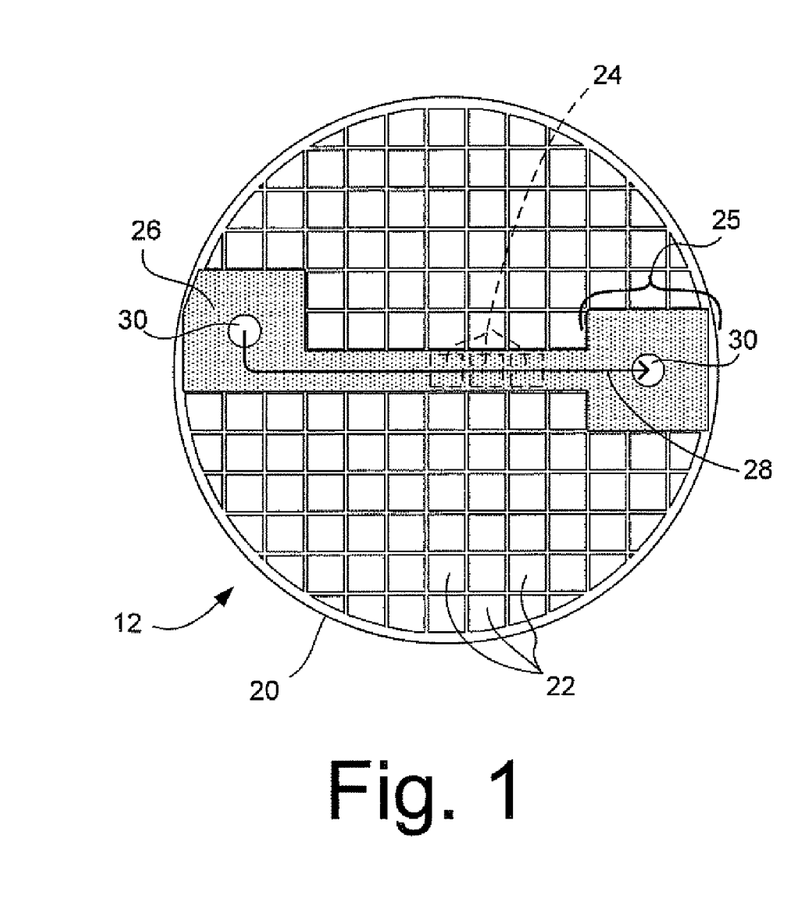
FIG. 1 is a plan view of reactor comprising an extruded multicellular body or honeycomb showing a fluidic path in a plane perpendicular to the cells according to one embodiment of the present invention.

The present invention relates to a reactor 12 comprising a multicellular extruded body 20, an embodiment of which is represented in plan view in FIG. 1. The body 20 has a plurality of cells extending in parallel in a direction from one end of the body to the other, with the cells seen end-on in FIG. 1. The cells include a first plurality of cells 22 open at both ends of the body and a second plurality of cells 24 closed at one or both ends of the body by one or more plugs 26 or by a more or less continuous plugging material 26 disposed at or near the end of the body and at least partly within the channels of the second plurality of cells 24. The second plurality of cells 24 (the closed cells) are contiguous cells and cooperate to help define a fluidic passage extending through the body 20. The passage follows a serpentine path up and down along the cells 24, in the general direction shown by arrowed path 28 in FIGS. 1 and 2, extending laterally perpendicular to the cells 24 only at or near the ends 32, 34 of the body 20, where walls between the cells 24 are shortened or ported or otherwise breached to allow fluid communication between the cells 24.

Figure 2:
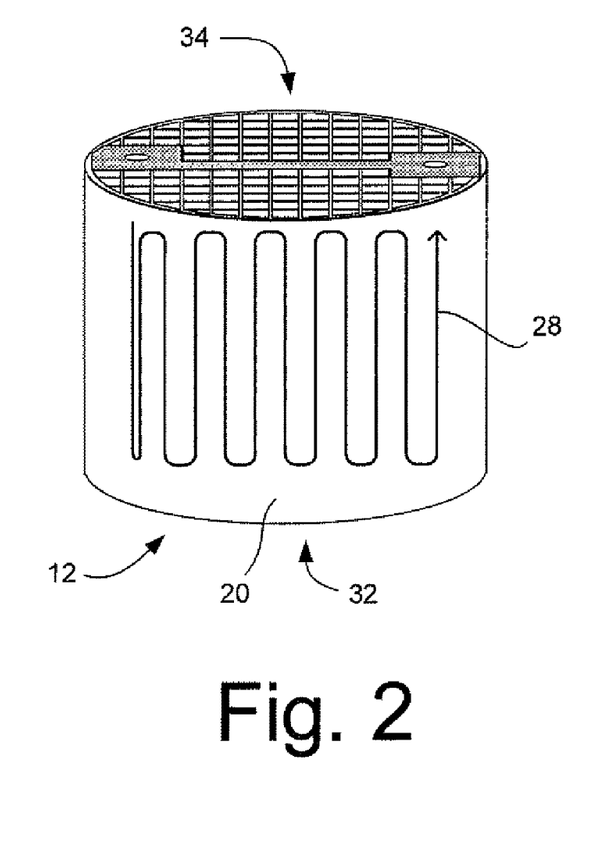
FIG. 2 is a side elevation view of the reactor comprising an extruded multicellular body or honeycomb of FIG. 1, showing additional detail of a fluidic path according to an embodiment of the present invention.
Figure 5:
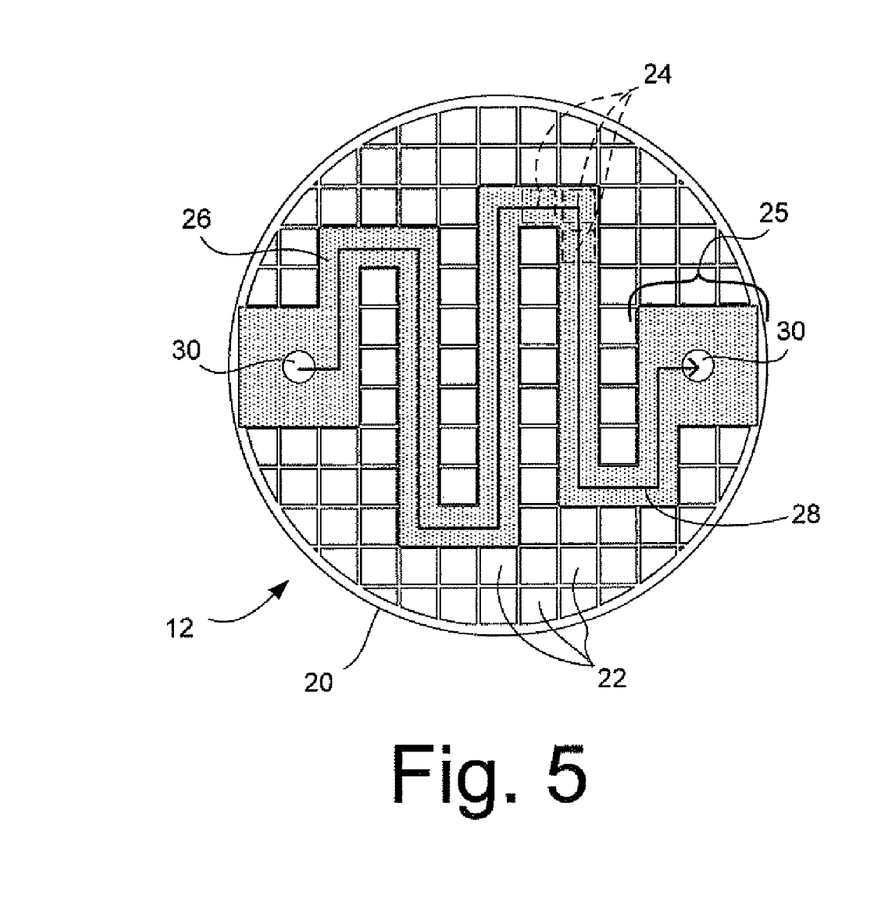
FIG. 5 is a plan view of reactor comprising an extruded multicellular body or honeycomb showing another fluidic path in a plane perpendicular to the cells according to another embodiment of the present invention.

In another embodiment of the present invention, the path is not serpentine only in the direction along the cells as shown in FIG. 2, but also in the plane perpendicular to the cells, as shown in the plan view of FIG. 5. The plurality of closed cells 24 in the plan view of FIG. 5 is arranged in a generally serpentine path in the plane perpendicular to the cells 24 and 22. The fluid path 28 is thus serpentine at a relatively higher frequency in the direction in and out of the plane of FIG. 5, and at a relatively lower frequency within the plane of the figure. This doubly serpentine path structure allows for high total path volume and long total path length while maintaining a large surface area between the path and the open channels 22, and allows for small total package size for the reactor 12.

The serpentine arrangement of closed cells, visible in FIG. 5, is one preferred embodiment of the present invention; other arrangements are possible or even desirable, depending on the application. It is desirable, however, regardless of the shape of the path within the plane of FIG. 1 or FIG. 5, that the majority of the path be only one cell wide. This results in an easily manufactured fluidic path capable of having very high surface to volume ratio.

Figure 6:
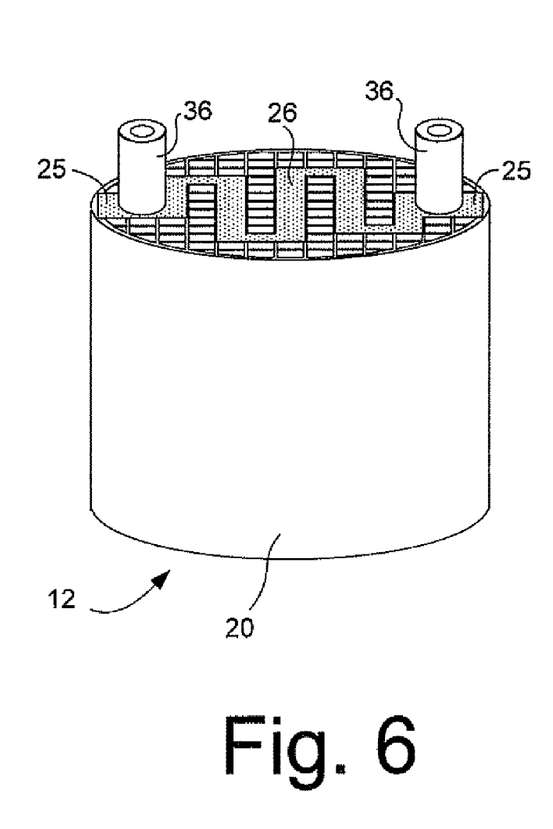
FIG. 6 is a side elevation view of the reactor comprising an extruded multicellular body or honeycomb of FIG. 5, showing fluidic couplers coupled to input and output ports at one end of the extruded body.

Additional cells of cells 24, in a grouping 25 of more than one cell in width, if desired, may be plugged around the entry and exit ports 30 of the pathway, as shown in FIGS. 1 and 5. These additional plugged cells can provide support for an O-ring seal or a fired-frit seal or other sealing system for providing a fluidic connection to the path 28, and optionally may not form a part of the path 28. One alternative is shown in the embodiment of FIG. 6, in which access tubes 36 have been sealed to two groupings 25 of plugged cells.

The extruded body or honeycomb 20 is desirably formed of an extruded glass, glass-ceramic, or ceramic material for durability and chemical inertness, Alumina ceramic is generally preferred as having good strength, good inertness, and higher thermal conductivity than glass and some ceramics. The multicellular body desirably has a cell density of at least 200 cells per square inch. Higher densities can lead to higher heat exchange performance devices. Bodies having 300 or more, or even 450 or more cells per square inch are of potential interest for forming high performance devices.

Figure 3:
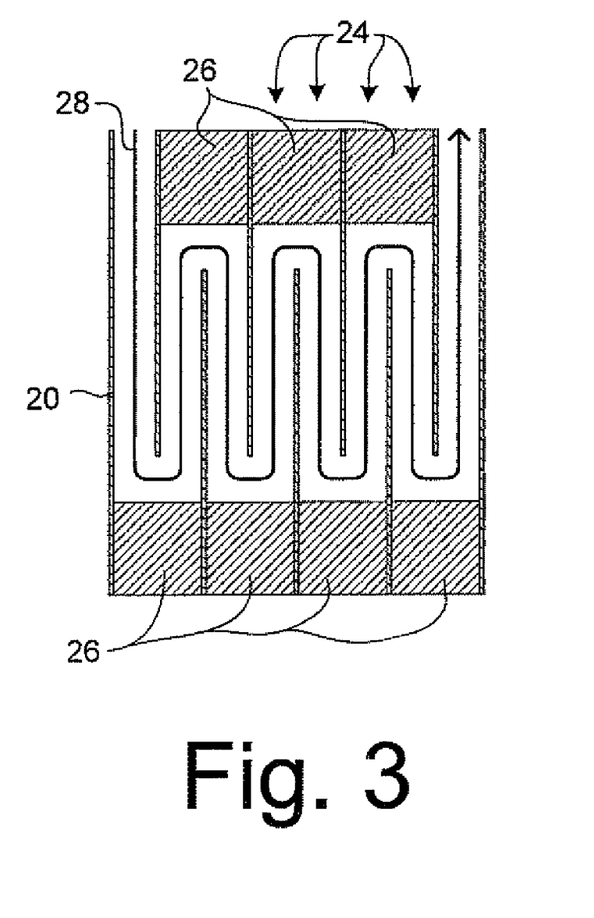
FIG. 3 is a cross-sectional view of channels closed on one or both ends of an extruded body, showing one method useful in the context of the present invention for interconnection between channels.
Figure 4:
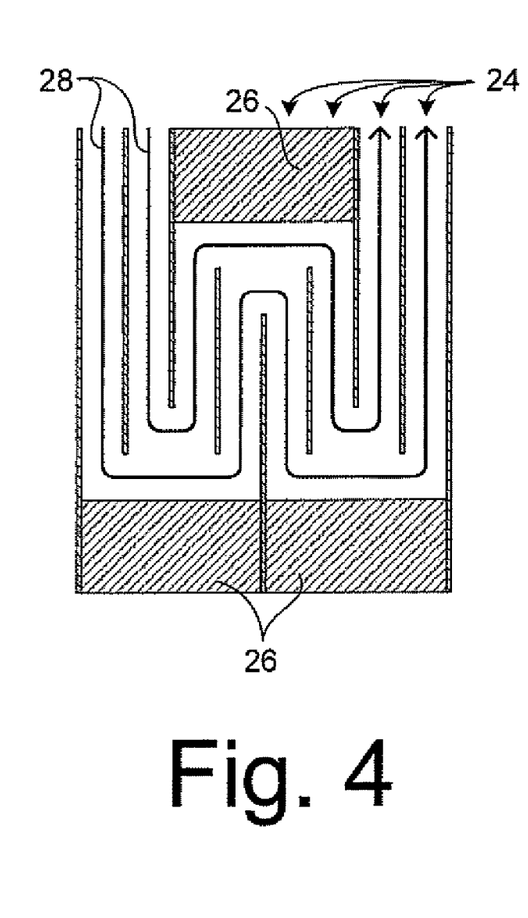
FIG. 4 is a cross-sectional view of channels closed on one or both ends of an extruded body, showing another method useful in the context of the present invention for interconnection between channels.

The path 28 may follow a single cell up and down in the direction along the cells 24, as shown in FIG. 3. Alternatively, the path 28 may follow multiple successive respective groups of two or more cells in parallel, in the direction along the cells 24, as shown in FIG. 4.

Figure 7:
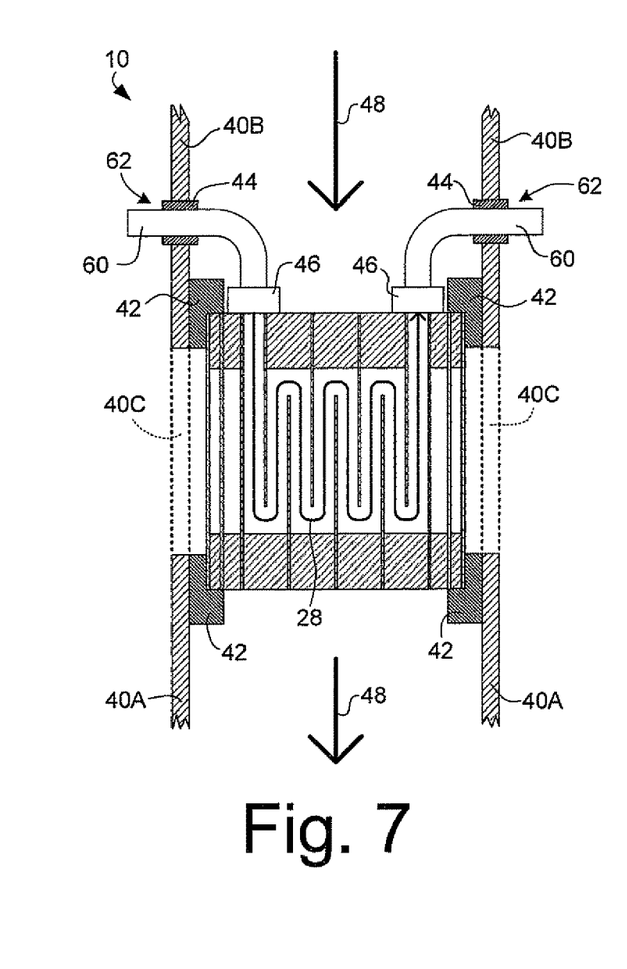
FIG. 7 is a cross-sectional view of a reactor of the present invention comprising an extruded multicellular body or honeycomb showing fluidic connections to the extruded body according to one embodiment of the present invention.

FIG. 7 is a cross-sectional view of a connected reactor 10 of the present invention comprising an extruded multicellular body or honeycomb, and showing fluidic connections to the extruded body according to one alternative embodiment of the present invention. In the embodiment of FIG. 7, a fluid housing 40 supports the extruded body via seals 42. The housing 40 may comprise a single unit enclosing the extruded body, or the portions 40C may optionally be excluded, such that the housing comprises two parts 40A and 40B. A fluid path 48, typically for flowing a thermal control fluid, is formed through the open channels 22 as shown in FIGS. 1 and 5 in cooperation with the housing 40. Path 28 in the body 20 is accessed via fluid conduits 30 through fluidic couplers 46. Fluid conduits 60 pass through openings 62 in the housing 40, in which openings 62 a seal 44 is employed.

Figure 8:
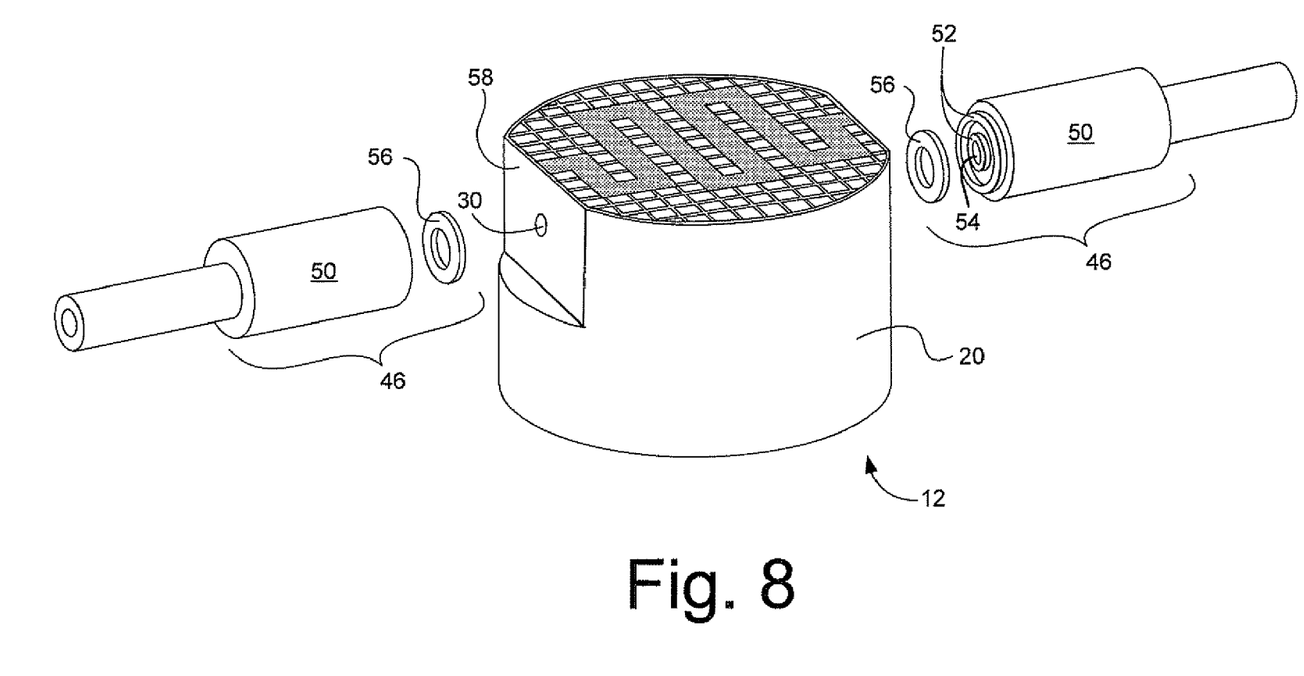
FIG. 8 is an exploded perspective view of a reactor comprising an extruded multicellular body or honeycomb, showing fluidic couplers coupled to input and output ports at the side(s) of the extruded body.

FIG. 8 is an exploded perspective view of a reactor 12 comprising an extruded multicellular body or honeycomb, showing fluidic couplers 46 arranged for coupling to input and output ports 30 at the side(s) of the extruded body 20. Fluidic couplers 46 include a fluid coupler body 50 having raised concentric rings 52 surrounding a fluid passage 54. When assembled, an elastomeric O-ring 56 is retained by the raised rings 52 in compression against a flat surface 58 formed on the sided of the body 20. The large number of wall structures within the extruded body 20 provides sufficient support for a robust compression seal against the flat surface 58.

Figure 9:
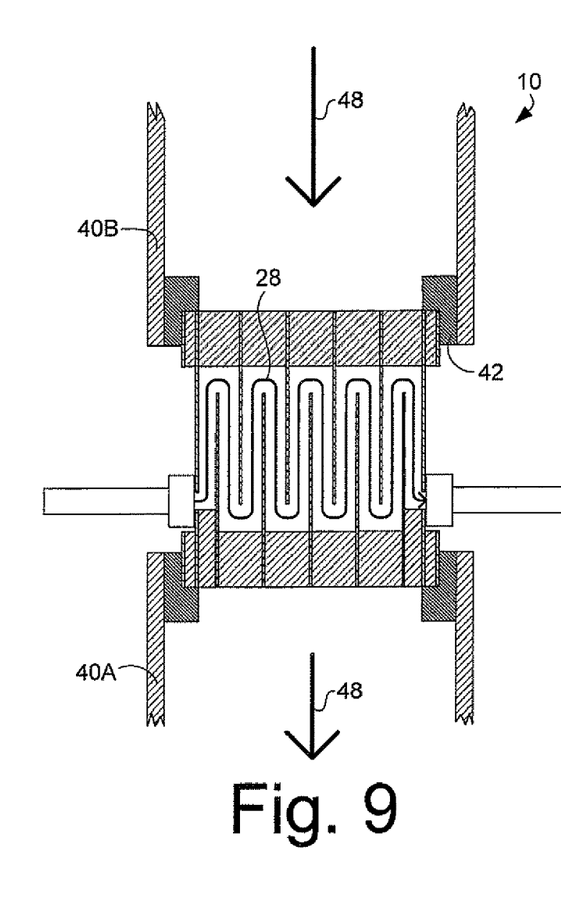
FIG. 9 is a cross-sectional view of a reactor of the present invention comprising an extruded multicellular body or honeycomb showing fluidic connections to the extruded body according to another embodiment of the present invention.

A reactor 12 such as the one in the embodiment of FIG. 8 allows for a preferred configuration of a connected reactor 10, as shown in FIG. 9, which is cross-sectional view of a connected reactor 10 of the present invention, comprising an extruded multicellular body or honeycomb 20 and showing fluidic connections to the extruded body 20 according to another and presently preferred embodiment of the present invention. Advantages over the embodiment of FIG. 8 in include the absence of seals 44, and absence of any seal (such as seals 44 or fluidic couplers 46) directly between the two fluid paths 28, 48. Seal materials may thus be optimized for the fluid of each path independently, and seal failures will not result in fluids from the two paths 28, 48 intermixing.

Figure 10:
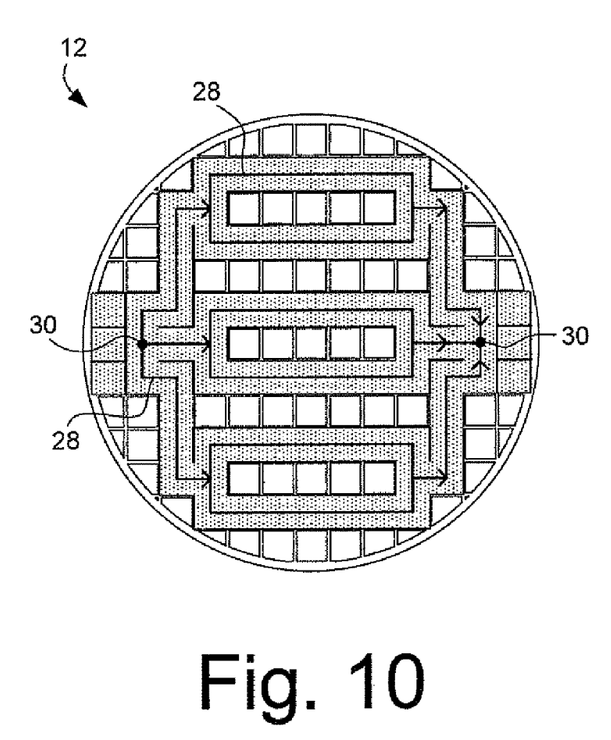
FIG. 10 is a plan view of reactor comprising an extruded multicellular body or honeycomb showing yet another fluidic path in a plane perpendicular to the cells according to an embodiment of the present invention.
Figure 11:
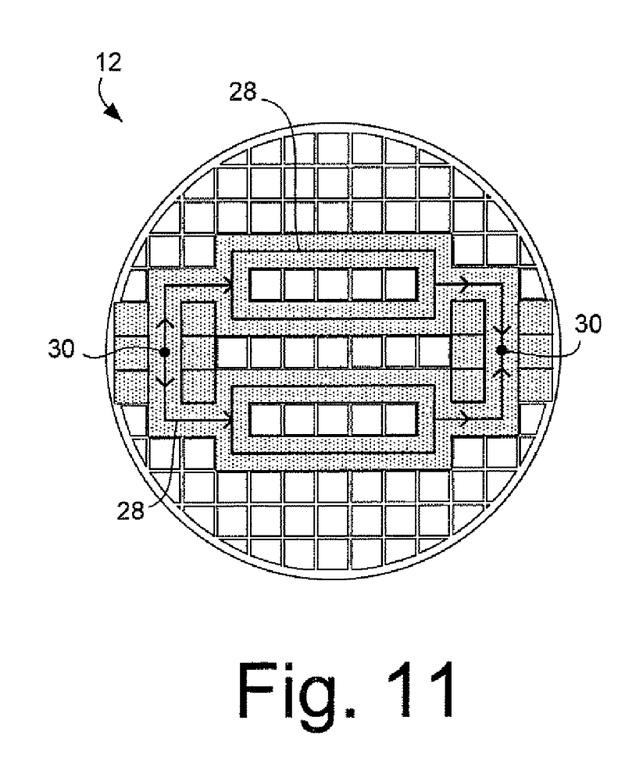
FIG. 11 is a plan view of reactor comprising an extruded multicellular body or honeycomb showing still another fluidic path in a plane perpendicular to the cells according to an embodiment of the present invention.
Figure 12:
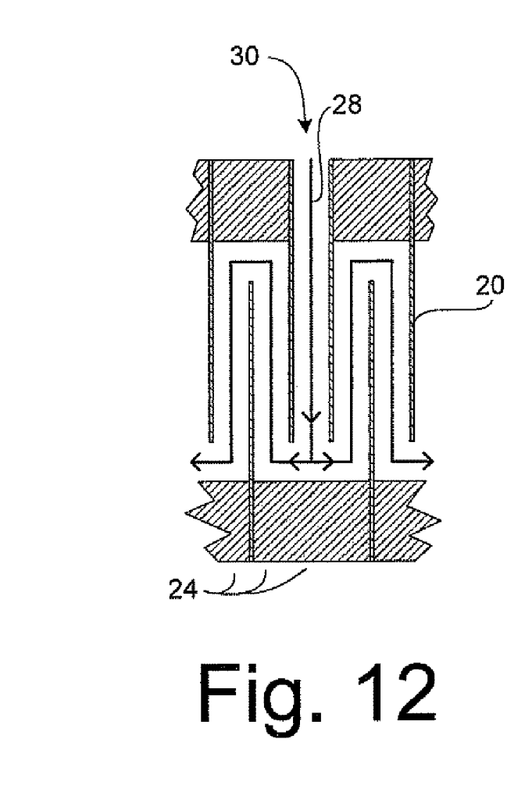
FIG. 12 is cross-sectional view of channels closed on one or both ends of an extruded body, showing a method useful in the context of the present invention for manifolding or dividing fluid pathways, with two pathways beginning from one and beginning within the extruded body.

FIGS. 10 and 11 are plan views of reactors 12 comprising an extruded multicellular body or honeycomb showing still another fluidic path 28 in a plane perpendicular to the cells or channels 22,24 according to additional alternative embodiments of the present invention. As may be seen in the figures, these embodiments include manifolding within the fluid path 28, such that the path 28 divides into parallel path in the plane perpendicular to the cells. FIG. 12 is cross-sectional view of channels 24 closed on one or both ends of an extruded body 20, showing a method useful in the context of the present invention for manifolding or dividing fluid pathways, with two pathways dividing from one in a plane parallel to the cells or channels 22, 24, and beginning within the extruded body 20.

Figure 13:
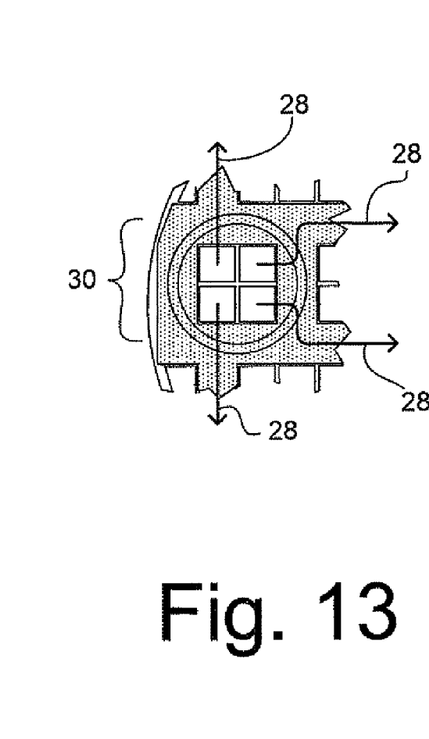
FIG. 13 is a partial plan view of one end of an extruded body or honeycomb structure showing multiple passages beginning within the extruded body at an input port on the one end of the extruded body.

FIG. 13 is a partial plan view of one end of an extruded body or honeycomb structure showing a method of or structure for manifolding having multiple parallel passages 28 beginning within the extruded body at an input port 30 on the one end of the extruded body.

Figure 14:
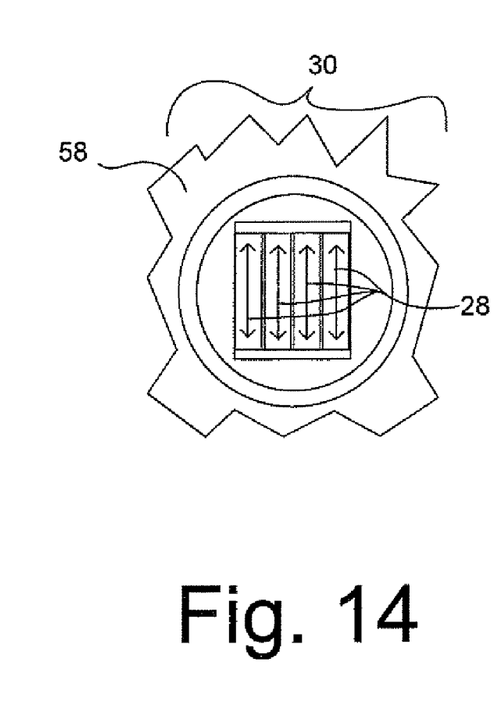
FIG. 14 is a partial side view of an extruded body or honeycomb structure showing multiple passages beginning within the extruded body at an input port on a wall on a side of the extruded body.

FIG. 14 is a partial side view of an extruded body or honeycomb structure showing another embodiment of multiple passages 28 beginning within the extruded body at an input port 30 on a wall or flat surface 58 on a side of the extruded body.

Figure 15:
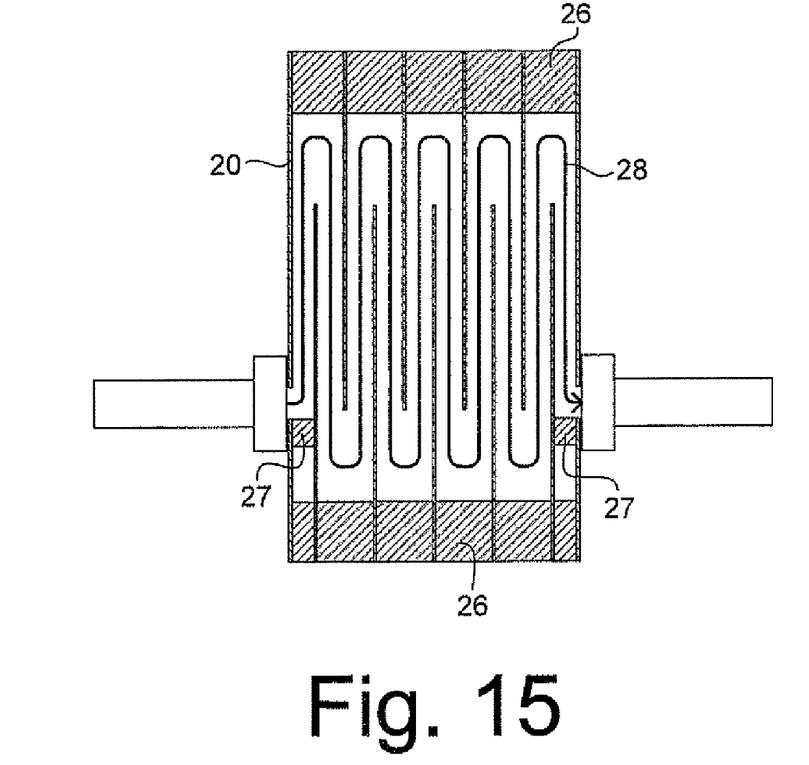
FIG. 15 is a cross-sectional view of an extruded body or honeycomb structure showing deep plugs 27.

As shown in the cross-sectional view of FIG. 15, deep plugs 27 that border the passage 28 at the input port 30 may be used if desired in embodiments having input ports on the side of the extruded body, so as to prevent or reduce "dead" volume along the path or passage 28.

Figure 16:
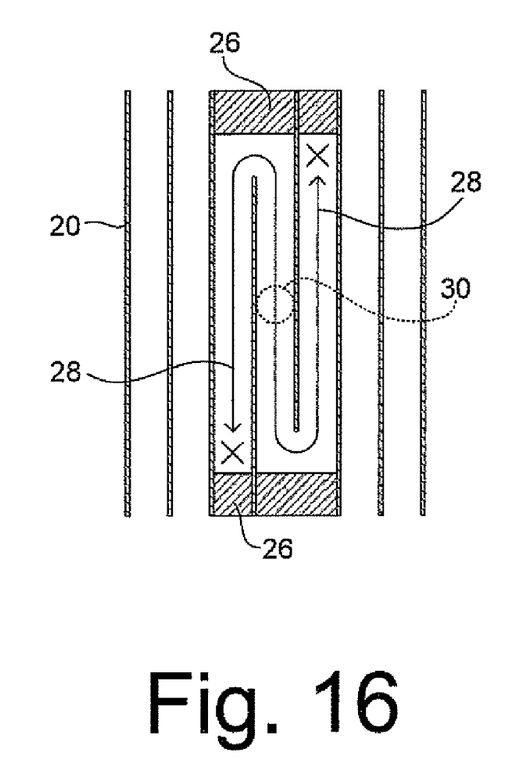
FIG. 16 is a cross-sectional view of an extruded body or honeycomb structure showing two passages 28 beginning with the extruded body at an input port 30 at a side of the extruded body.
Figure 17:
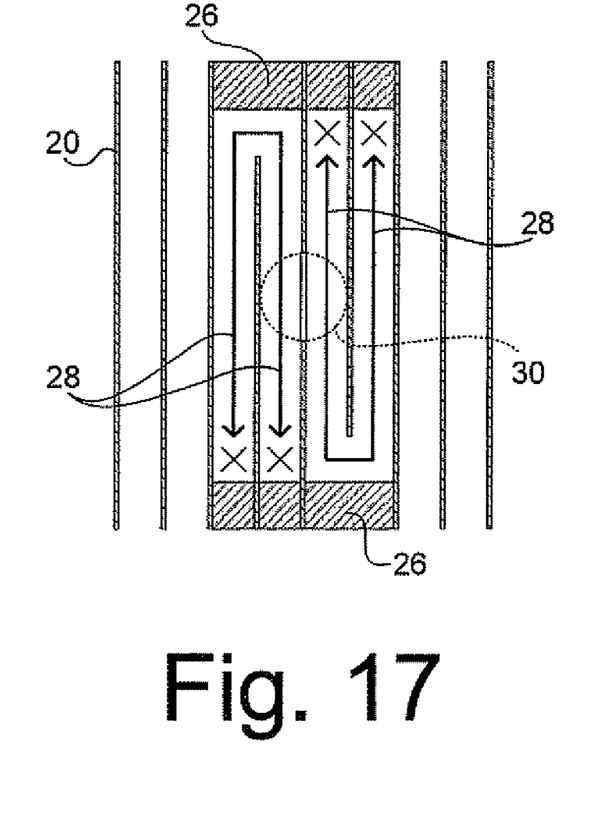
FIGS. 17 and 18 are two different embodiments of an extruded body or honeycomb structure having four passages 28 beginning within the extruded body at an input port 30 at a side of the extruded body.
Figure 18:
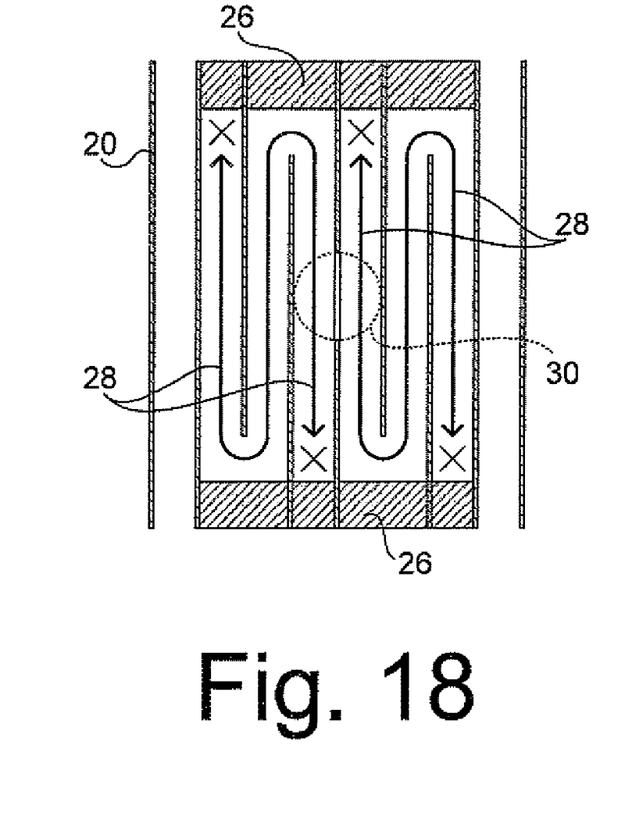

As shown in the cross section of FIG. 16, a single input port 30 having a width the same or less as a single cell or channel 22, 24 may provide access to two passages 28 beginning within the extruded body 20 at the input port 30 at a side of the extruded body 20. In FIGS. 16-18, "X"-marks represent the path or passage 28 going away from the viewer, into the plane of the figure.

As shown in the cross sections of FIGS. 17 and 18, a single input port 30 having a width greater than a single cell or channel 22, 24 but less than two cells or channels may provide access to four passages 28 beginning within the extruded body 20 at the input port 30 at a side of the extruded body 20.

What is claimed is:

1. A reactor for reacting fluids such as fluids in continuous flow, the reactor comprising:

a multicellular extruded body having cells extending in parallel in a direction from a first end of the body to a second end, the body having a first plurality of cells open at both ends of the body and a second plurality of said cells closed at one or both ends of the body, the second plurality being contiguous cells and cooperating to define at least in part a fluidic passage extending at least partly through the body, the passage having a serpentine path back and forth along cells of the second plurality, the passage connecting laterally from cell to cell, within cells of the second plurality, at or near the ends of the body.

2. The reactor according to claim 1 wherein the passage has a width of one cell in a plane perpendicular to the cells of the body.

3. The reactor according to claim 1, wherein the passage has a serpentine path leading back and forth at least two times along the cells of the second plurality of cells.

4. The reactor according to claim 1, wherein the passage is accessible from the exterior of the body via an input port and an output port, the input port positioned at the first end of the body and surrounded by cells of the body which are closed by plugs at the first end of the body.

5. The reactor according to claim 4, further comprising a fluidic coupler coupled to the input port, the fluidic coupler having a compression seal, wherein the compression seal is compressed against the plugs or against a surface supported by the plugs in the cells surrounding the input port.

6. The reactor according to claim 4, further comprising a fluidic coupler coupled to input port, the fluidic coupler being adhered to the plugs or to a surface supported by the plugs in the cells surrounding the input port.

7. The reactor according to claim 6 wherein the fluidic coupler is adhered to the plugs or to a surface supported by the plugs by a sintered frit.

8. The reactor according to claim 1, wherein the passage is accessible from the exterior of the body via an input port and output port, the input port positioned at in a wall at a side of the body.

9. The reactor according to claim 8, further comprising a fluidic coupler coupled to the input port, the fluidic coupler having a compression seal, wherein the compression seal is compressed against the wall at a side of the body.

10. The reactor according to claim 9, wherein the body includes a includes a plug that borders the passage at the input port.

11. The reactor according to claim 8, further comprising a fluidic coupler coupled to input port, the fluidic coupler being adhered to the wall at a side of the body.

12. The reactor according to claim 11 wherein the fluidic coupler is adhered to the wall at a side of the body by a sintered frit.

13. A reactor according to claim 1, wherein the second plurality of cells cooperates to define at least in part a first fluidic passage extending at least partly through the body and a second fluidic passage extending at least partly through the body, the first and second passages each having a serpentine path back and forth along cells of the second plurality, the first and second passages each connecting laterally from cell to cell, within cells of the second plurality, at or near the ends of the body.

14. A reactor according to claim 13 wherein the first and second passages begin within the body and stem from a single passage.

15. The reactor according to claim 13, wherein the first and second passages each end within the body and rejoin to form a single passage.

16. The reactor according to claim 13, wherein the first and second passages begin at the input port.

17. The reactor according to claim 13, wherein the first and second passages begin at or near the ends of the body.

18. The reactor according to claim 1, wherein the passage connects laterally from cell to cell, within cells of the second plurality, via shortened cell walls of the cells of the second plurality.

19. The reactor according to claim 1, wherein the serpentine path comprises a doubly serpentine path.

20. The reactor according to claim 1, wherein the serpentine path follows multiple successive respective groups of two or more cells in parallel.

* * * * *